United States Patent [19]

Krikorian

[11] Patent Number: 5,319,618
[45] Date of Patent: Jun. 7, 1994

[54] SYSTEM UTILIZING A HIGH-FREQUENCY TONE FOR SWITCHING FROM A FIRST MUSIC SOURCE TO A SECOND MUSIC SOURCE

[76] Inventor: Thomas M. Krikorian, 3750 Spanish Oaks Dr., West Bloomfield, Mich. 48323

[21] Appl. No.: 936,852

[22] Filed: Aug. 27, 1992

[51] Int. Cl.⁵ .................................. H04B 1/20
[52] U.S. Cl. ............................... 369/2; 360/61
[58] Field of Search .................. 369/2, 3, 4, 5, 47, 369/48, 17; 360/5, 27, 61; 84/616, 622

[56] References Cited

U.S. PATENT DOCUMENTS

| | | | |
|---|---|---|---|
| 4,641,253 | 2/1987 | Mastran | 364/518 |
| 4,969,135 | 11/1990 | Tobe | 369/2 |
| 5,008,762 | 4/1991 | Sung | 360/61 |
| 5,067,119 | 11/1991 | Yoshida et al. | 369/47 |

Primary Examiner—Robert J. Pascal
Assistant Examiner—Tan Dinh
Attorney, Agent, or Firm—Gifford, Groh, Sprinkle, Patmore and Anderson

[57] ABSTRACT

A system for switching from a programmed track of a music source to a succeeding programmed track of a music source. The system includes a detector chip for detecting a cue tone in excess of 15 kHz placeable on each programmed music track. The detector chip generates a signal causing a switch to activate a successive player to play. Additional switches pause and re-advance the previous music source to play a further succeeding programmed track.

14 Claims, 1 Drawing Sheet

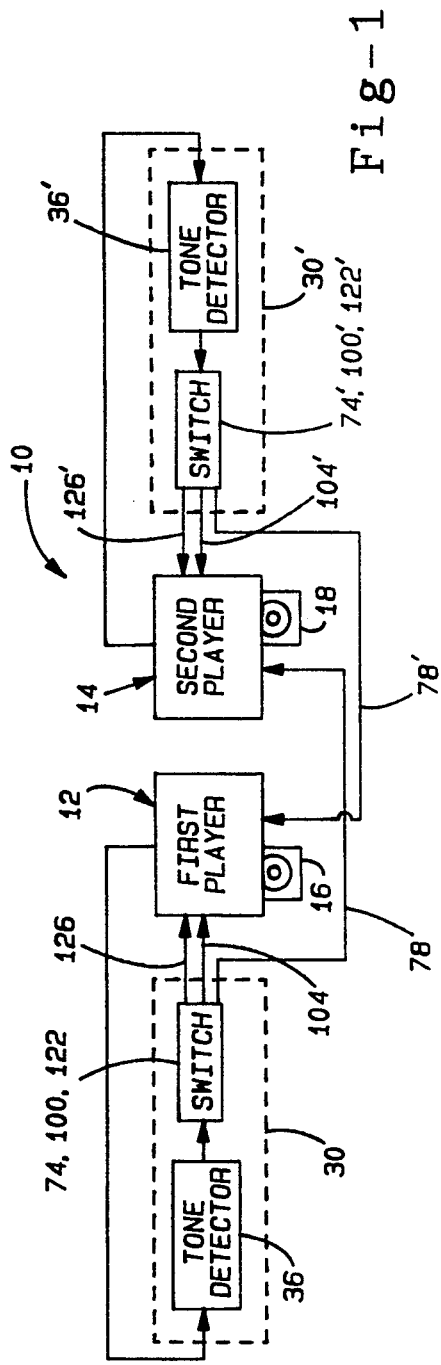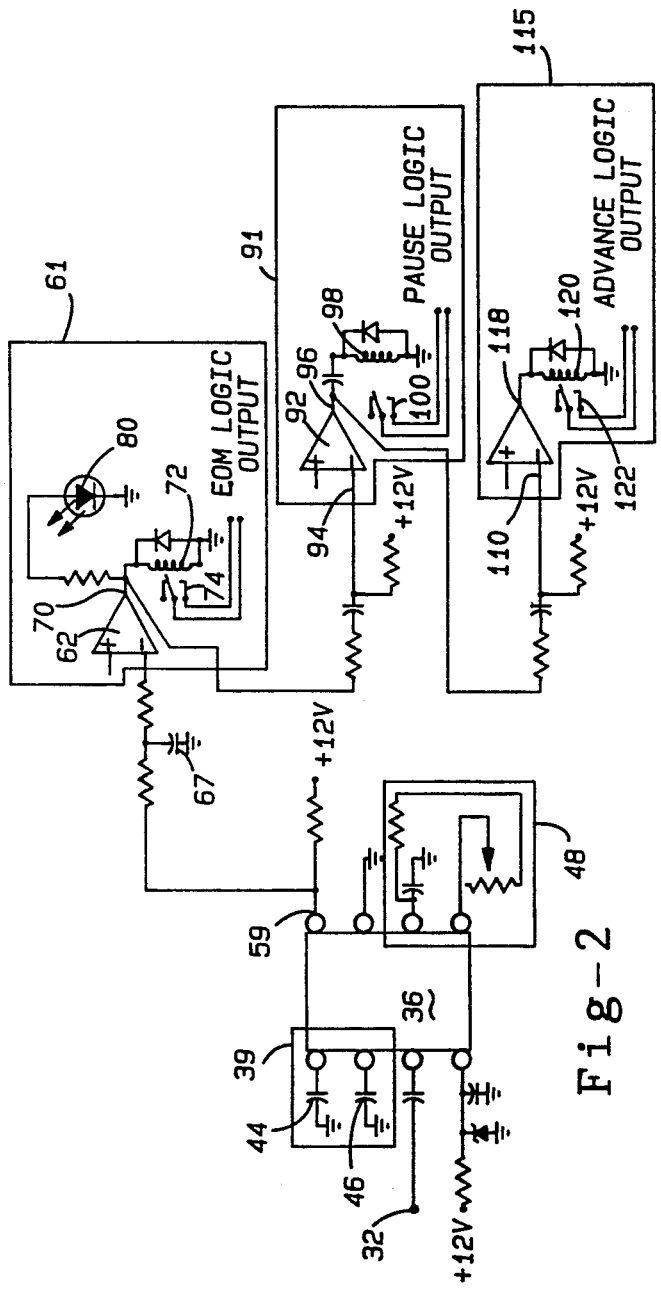

SYSTEM UTILIZING A HIGH-FREQUENCY TONE FOR SWITCHING FROM A FIRST MUSIC SOURCE TO A SECOND MUSIC SOURCE

BACKGROUND OF THE INVENTION

I. Field of the Invention

The present invention relates to a cuing system for activating one music source from another music source and, more particularly, to a high-frequency cue tone and a sensor circuit for accomplishing the same.

II. Description of the Prior Art

Various means for cuing in a second piece of music upon the termination of a first piece of music are known in the art. This procedure is commonly employed by radio stations providing musical formats of all varieties. The purpose of the cuing system is to enable a music source to be activated simultaneously and automatically upon the termination of a prior selection. Such a cuing system minimizes dead space between musical selections thereby reducing air-time expenses and the risk of losing the listening audience.

Radio stations traditionally broadcast music recorded on reel-to-reel tapes. When a tape has finished playing, another tape must necessarily be cued-in. This is usually accomplished by the placing of an index-pointer, or a 25 hertz signal, on the first reel-to-reel tape at the point where it is desirable to cue-in the second tape. Appropriate sensing means are provided to detect the index-pointer and, in response thereto, to activate the following tape.

Employing reel-to-reel tapes, however, is a drawback in light of the newer compact disc (CD) technology and other audio-to-digital storage mediums which provide superior sound quality and greater convenience. Unfortunately, the index-pointer cuing system employed in the reel-to-reel tapes cannot be adapted for use with compact disk equipment. This is so because most compact disk players in production do not provide the necessary electronic capabilities to interpret the low frequency cue-tones and to activate secondary players in response thereto. Another drawback is the undesirability of a low-frequency cue tone itself since the tone, which is audible to the casual listener, must necessarily be transmitted over the frequency modulation (FM) radio band.

SUMMARY OF THE PRESENT INVENTION

The present invention is a cuing system for switching from a music source to another music source. A cue tone is provided on the first musical track of the first player, at a point where it is desirable to alert the second player to play a succeeding track. The cue tone is a frequency signal preferably of a sufficiently high frequency (20 to 22.05 kilohertz (kHz)) which is inaudible to the human ear yet interpretable by the appropriate sensing means which cues in the next player.

To this end, there is also provided a sensor circuit for sensing and interpreting the cue tone and for activating the second player in response thereto. The sensor circuit employs conventional digital technology and may be conveniently mounted within the first player. Alternatively, the sensor circuit may be mounted in an external automation system which interfaces the various players.

The sensor circuit includes a means for sensing the cue-tone. Logic means are also provided and are responsive to a signal issued by the sensing means to activate the second player. After issuing the cue tone at the completion of the musical piece, additional logic means pauses the first player and then advances it to the next desired musical track.

The second player may also be of a type capable of operating with the cue tone of the present invention such that the first and second musical players can be arranged to operate in a back and forth manner. Accordingly, a second cue tone is likewise placeable on the track being played by the second player which results in the second player being paused and the first player being re-advanced. In this way, the players can successively activate each other to play succeeding musical tracks in an alternating fashion.

BRIEF DESCRIPTION OF THE DRAWING

Reference is made to the attached drawing wherein like reference points refer to like parts throughout the several views, and in which:

FIG. 1 is a schematic of a preferred embodiment of the present invention; and

FIG. 2 is a diagrammatical view of the sensor circuit of the present invention.

DETAILED DESCRIPTION OF THE INVENTION AND PREFERRED EMBODIMENT THEREOF

Referring to FIG. 1, a cuing system 10 is shown for switching from a music source 12 to another music source 14. In a preferred embodiment, the music sources 12, 14 are compact disk players, each with a respective disk 16, 18. Although the preferred embodiment employs compact disk players 12, 14, any combination of computer storage devices with audio output means can provide alternative music sources.

A cue tone of relatively high frequency is provided at the end of music selections on the disks 16, 18. The tone's frequency, preferably within a 20–22.5 kHz range, remains inaudible to the human ear, yet detectable by the conventional compact disk player. The cue tone is also detected at a frequency range which is above the frequency range which can be broadcasted over AM and FM radio bands. Although the cue tone can be placed anywhere on the disks 16, 18, it is ideally placed at the ending of a music selection so that the succeeding player 14 is cued precisely at the ending of the first track, thereby minimizing the dead space between music selections.

Upon detecting the cue tone, the player 12 will pause itself and advance another player 14. Referring to FIGS. 1 and 2, a sensor circuit 30, internally mounted within the players 12, 14, detects tones emitted from the disks 16, 18. The sensor circuit is as described by the following.

Referring to FIG. 2, the sensor circuit 30 is provided with a tone detector chip 36, identification number LM567CN. Prior to operation, the tone detector chip 36 must be properly calibrated to respond specifically to a cue tone frequency input 32 as opposed to other sounds. Accordingly, the chip 36 is connected to a frequency band width circuit 39 and a center frequency adjustment circuit 48. Capacitors 44 and 46 are selected to establish a band width of 0.5 to 1.0 kHz. Hence, when the chip receives the cue tone input 32, the chip transmits an output signal 59 which initiates a series of responses from an End-of-Message (EOM) Logic Circuit 61, a Pause Logic Circuit 91, and an Advance Logic Circuit 115.

The EOM circuit 61 is preceded by a capacitor 67 which delays the response time of the EOM circuit 61. By varying the value of the capacitor 67, a disk jockey can select a desired delay between music selections. In the preferred embodiment, a 0.1 uf capacitor is selected to achieve a 0.25 second delay between the start of the cue tone and the response of the EOM circuit 61. An EOM output 70 from a differential amplifier 62 illuminates an LED 80 which indicates both that the cue tone input 32 has been received and that the Pause Logic Circuit 91 has been activated. To prevent false responses to radio frequency noise or program spikes, the output 70 from the differential amplifier 62 energizes a coil 92 which closes a relay switch 74 for a predetermined time, preferably 0.25 seconds.

The EOM output signal 70 is further transmitted to an input terminal 94 of the Pause Logic Circuit 91. An output 96 from the Pause Logic Circuit 91 energizes a coil 98 and closes a relay switch 100, thereby pausing the player 12.

The Pause Logic Circuit output 96 is further transmitted to an input terminal 110 of the Advance Logic Circuit 115. An output 118 from the Advance Logic Circuit 115 energizes a coil 120 which closes a relay switch 122. Upon closure of the switch 122, a signal is transmitted, thereby advancing the succeeding player 14.

In operation, the tone detector chip 36 of the sensor circuit 30 detects the cue tone input 32 which was placed on its disk 16. The detector chip 36 generates a signal 59 which is delayed prior to entering the EOM circuit 61. The EOM output 70 illuminates an LED 80, which indicates that the cue tone 32 has been received, then activates a relay switch 74 to close and then drives the Pause Logic Circuit 91. The Pause Logic Circuit output 96, in turn, pauses the player 12 and drives the Advance Logic Circuit 115. Finally, the Advance Logic Circuit output 118 advances the second player 14.

The succeeding player 14, also equipped with a cue tone sensor circuit 30, performs identically to the preceding player 12. Thus, upon sensing a cue tone from its disk 18, the succeeding player 14 pauses and re-advances the prior player 12.

It should be understood that, although the primary application of the present invention is directed toward compact disk technology, any digital-to-audio tape source or computer storage device with audio output means may be utilized. The switching means provided by the relay switches may also be substituted in favor of other means for activating the logic outputs, or may be removed in favor of activating means provided on the players themselves.

Having disclosed my invention, many modifications thereto will become apparent to those skilled in the art to which it pertains without deviation from the spirit of the invention as defined by the scope of the appended claims.

I claim:

1. A system for switching from a first programmed track of a first player to a succeeding programmed track of a second player, comprising:
   means for detecting a cue tone at a frequency above that discernible to the human ear, said cue tone being present on said first programmed track of said first player; and
   means for activating said second player in response to said detecting means to play said succeeding programmed track.

2. The system as described in claim 1, wherein said cue tone is detected at a frequency range which is above the frequency range which can be broadcasted over AM and FM radio bands.

3. The system as described in claim 1, wherein said cue tone is detected at a frequency in the range of 20 to 22.05 kHz by said detecting means.

4. The system as described in claim 1, wherein said detecting means and said activating means are provided in a sensor circuit.

5. The system as described in claim 4, wherein said first track and said succeeding track are musical compositions arranged to be played in succeeding fashion.

6. The system as described in claim 5, wherein said sensor circuit pauses said first player once said activating means activates said second player.

7. The system as described in claim 6, wherein said sensor circuit advances said first player to a further succeeding musical track once said first player has been paused.

8. The system as described in claim 7, wherein said second player has a further said cue tone on said succeeding musical track to alert said first player to play said further succeeding musical track.

9. The system as described in claim 1, wherein said first and second players are first and second compact disk players.

10. The system as described in claim 1, wherein said first and second players are first and second storage mediums.

11. The system as described in claim 1, wherein said first and second players are first and second computer storage devices with audio output means.

12. The system as described in claim 1, wherein said detecting means and said activating means are provided in a sensor circuit mounted in an automation system to which said first and second players are separately connected, said automation system activating said second player.

13. The system as described in claim 12, wherein said sensor circuit pauses said first player once said activating means activates said second player.

14. The system as described in claim 13, wherein said sensor circuit advances said first player to a further succeeding musical track once said first player has been paused.

* * * * *